US010102365B2

United States Patent
George et al.

(10) Patent No.: US 10,102,365 B2
(45) Date of Patent: Oct. 16, 2018

(54) USER AUTHENTICATION USING TEMPORAL KNOWLEDGE OF DYNAMIC IMAGES

(71) Applicant: INTERNATIONAL BUSINESS MACHINES CORPORATION, Armonk, NY (US)

(72) Inventors: David P. George, Eastleigh (GB); Benjamin J. Hardill, Eastleigh (GB); Stephen D. Pipes, Southampton (GB); Robert S. Smart, Chandlers Ford (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/604,655

(22) Filed: Jan. 23, 2015

(65) Prior Publication Data
US 2015/0220723 A1    Aug. 6, 2015

(30) Foreign Application Priority Data
Feb. 6, 2014    (GB) .................................. 1402000.2

(51) Int. Cl.
*G06F 21/36*    (2013.01)
*G06F 21/34*    (2013.01)

(52) U.S. Cl.
CPC .................................. *G06F 21/36* (2013.01)

(58) Field of Classification Search
CPC .......... G06F 21/30; G06F 21/44; G06F 21/33; G06F 21/34; H04L 63/10
(Continued)

(56) References Cited

U.S. PATENT DOCUMENTS 8,347,103 B2    1/2013 Jones et al.
2007/0277224 A1*    11/2007 Osborn ................... G06F 21/36
726/2
(Continued)

FOREIGN PATENT DOCUMENTS

EP    1422589 A1    5/2004
EP    2466519 A1    6/2012

OTHER PUBLICATIONS

Classification of holding hand for dynamic interface adjustment on mobile devices, Hsu et al, 10.1109/GCCE.2014.7031162, IEEE, 2014 (Year: 2014).*
(Continued)

*Primary Examiner* — Jahangir Kabir
(74) *Attorney, Agent, or Firm* — The Steadman Law Firm PLLC

(57) ABSTRACT

An approach is described for authenticating a user. An associated method includes displaying a dynamic image on a display screen, detecting a user interaction with the displayed image, and detecting a duration of the detected user interaction. The method further includes comparing the detected user interaction and the detected duration with a stored user interaction and a stored duration. The method further includes authenticating the user upon determining that the detected user interaction matches the stored user interaction and the detected duration matches the stored duration. In an embodiment, the method further includes transmitting the detected user interaction and the detected duration to a remote device. In such embodiment, the method step of comparing the detected user interaction and the detected duration with the stored user interaction and the stored duration is performed by the remote device.

20 Claims, 5 Drawing Sheets

(58) Field of Classification Search
USPC .................................................. 726/2, 4, 19
See application file for complete search history.

(56) References Cited

U.S. PATENT DOCUMENTS

| | | | | |
|---|---|---|---|---|
| 2008/0028205 | A1 | 1/2008 | Yang | |
| 2009/0313693 | A1 | 12/2009 | Rogers | |
| 2010/0180336 | A1* | 7/2010 | Jones | H04L 9/3226 726/19 |
| 2013/0036462 | A1* | 2/2013 | Krishnamurthi | G06F 21/32 726/19 |
| 2013/0263251 | A1* | 10/2013 | Fleizach | G06F 3/04883 726/19 |
| 2013/0305047 | A1* | 11/2013 | Xi | H04L 63/0428 713/168 |
| 2014/0082709 | A1* | 3/2014 | Lu | G06F 21/36 726/6 |
| 2014/0109219 | A1* | 4/2014 | Rohrweck | G06F 21/36 726/19 |
| 2014/0344922 | A1* | 11/2014 | Lam | G06F 21/629 726/19 |
| 2014/0359653 | A1* | 12/2014 | Thorpe | G06F 21/00 725/30 |
| 2015/0379249 | A1* | 12/2015 | Liang | G06F 1/1694 726/19 |
| 2016/0162116 | A1* | 6/2016 | Kuge | G06F 3/0418 345/173 |
| 2016/0179277 | A1* | 6/2016 | Kim | G06F 21/36 345/174 |

OTHER PUBLICATIONS

Detection of multiple points of contact on an imaging touch-screen, Ravoor et al, 10.1109/ICCICT.2012.6398135, IEEE, 2012 (Year: 2012).*

Dhamija, Rachna et al. Deja Vu: A User Study Using Images for Authentication. SSYM'00 Proceedings of the 9th conference on USENIX Security Symposium—vol. 9, pp. 4-4. Aug. 14-17, 2000. USENIX Association, Berkeley, CA.

Yamamoto, Takumi et al. Advantages of User Authentication Using Unclear Images: Automatic Generation of Decoy Images. AINA '09 Proceedings of the 2009 International Conference on Advanced Information Networking and Applications, pp. 668-674. May 26, 2009. IEEE Computer Society, Washington, D.C.

User Authentication with Image Verification. PHP MySQL Tutorial. Dec. 18, 2008. http://www.php-mysql-tutorial.com/wikis/php-tutorial/user-authentication-with-image-verification.aspx.

Intellectual Property Office, United Kingdom. Patents Act 1977: Search Report under Section 17(5), Application No. GB1402000.2, Jun 23 2004. [3 pages].

* cited by examiner

| TIME | X LOCATION | Y LOCATION | DURATION | PATH |
|---|---|---|---|---|
| 1000 | 240 | 120 | 1000 | |
| 5000 | 240 | 480 | 500 | |
| 7000 | 480 | 480 | 1000 | |

400

USER AUTHENTICATION USING TEMPORAL KNOWLEDGE OF DYNAMIC IMAGES

BACKGROUND

The present invention relates to user authentication using images, and more particularly relates to using temporal knowledge of dynamic images.

The use of static visual images as a prompt in a user authentication process is generally known. Typically, the use of such visual images provides a relatively intuitive way for a user to prove knowledge by interacting with the static image, or by selecting one or more images from a predefined set. The use of a static image limits the amount of knowledge a user can impart to the authentication scheme. For example, a user may select three points on an image to indicate knowledge of the position of those three points relative to the image.

"Déjà Vu: A User Study Using Images for Authentication"; Proceedings of the 9th conference on USENIX Security Symposium—Volume 9 (SSYM'00), Vol. 9. USENIX Association, Berkeley, Calif., USA, 4-4 discloses recognition-based, rather than recall-based, authentication which authenticates a user through the ability to recognize previously seen images.

PHP MySQL Tutorial, available at http://www.php-mysql-tutorial.com/wikis/php-tutorial/user-authentication-with-image-verification.aspx, discloses the creation of a login form which displays an image showing random numbers.

"Advantages of User Authentication Using Unclear Images—Automatic Generation of Decoy Images"; Takumi Yamamoto, Atsushi Harada, Takeo Isarida, and Masakatsu Nishigaki; Proceedings of the 2009 International Conference on Advanced Information Networking and Applications (AINA '09). IEEE Computer Society, Washington, D.C., USA discloses a user authentication system using "unclear images" as pass-images, in which only legitimate users can understand the meaning by viewing the original images corresponding to these unclear pass-images, which are meaningless to unauthorized users. This makes it difficult for attackers to memorize them, even though they may have observed authentication trials by legitimate users. Also disclosed is the automatic generation of decoy images, which are displayed along with the pass-images in the authentication window.

U.S. Pat. No. 8,347,103 B2 discloses authentication using a graphical password comprising static images displayed on a display screen. Each static image includes one or more associated attributes. The user sequentially selects static images, and a password is generated based on the combination of attributes of the selected images. The generated password is compared with a previously stored password to authenticate the user.

United States Published Patent Application 2009/0313693 A1 discloses the use of touches and movements on a touch sensitive surface to determine a graphical passcode. A user's selected graphical passcode is stored in memory for comparison to subsequent entries of the graphical passcode in order to authenticate the user.

Moving CAPTCH images, such as from NuCaptcha (http://www.nucaptcha.com/), are available in which a user views a moving image of, e.g., alphanumeric characters, and then inputs the alphanumeric characters themselves in order to identify that the user is a human and not a machine. The use of such images has drawbacks, since such images are static (i.e., unchanging) and are subject to either being computationally solvable (via Optical Character Recognition) or extremely difficult for humans to decipher. Hence, the intended user is discouraged from using the service associated with the authentication.

SUMMARY

The various embodiments of the invention provide a method for authenticating a user. The method includes the steps of displaying a dynamic image on a display screen, detecting a user interaction with the displayed image, and detecting a duration of the detected user interaction. The method further includes comparing the detected user interaction and the detected duration with a stored user interaction and a stored duration. The method further includes authenticating the user upon determining that (i) the detected user interaction matches the stored user interaction and (ii) the detected duration matches the stored duration.

In an embodiment, the method further includes transmitting to a remote device the detected user interaction and the detected duration. According to such embodiment, the step of comparing the detected user interaction and the detected duration with the stored user interaction and the stored duration is performed by the remote device, and the stored user interaction and the stored duration are stored at the remote device. Moreover, in such embodiment the method further includes receiving from the remote device an indication of whether the user is authenticated.

In an embodiment, the dynamic image includes a series of static images. In an alternative embodiment, the dynamic image includes a video data stream.

In an embodiment, the user interaction includes selection by the user of two or more events displayed in the dynamic image. The two or more events in such embodiment are separated by the duration of the user interaction. In an alternative embodiment, the user interaction includes following by the user of one or more dynamic objects displayed in the dynamic image. The following by the user of the one or more dynamic object occurs for the duration of the user interaction.

In an embodiment, the user interaction is detected using a touchscreen associated with the display screen. In an alternative embodiment, the user interaction is detected using one or more of a mouse or a keyboard associated with the display screen. In a further embodiment, the detected user interaction includes information with respect to one or more of contact time, contact position, contact length, and movement while in contact with the display screen. In a further embodiment, the stored user interaction and the stored duration include respective ranges of accepted values for the stored user interaction and the stored duration.

Embodiments of the invention further provide a system for authenticating a user. The system includes a display screen for displaying a dynamic image and an input device for detecting a user interaction with the dynamic image and a duration of the detected user interaction. The system further includes a processor that compares the detected user interaction and the detected duration with a stored user interaction and a stored duration. Furthermore, the processor authenticates the user upon determining that (i) the detected user interaction matches the stored user interaction and (ii) the detected duration matches the stored duration.

Embodiments of the invention further provide a computer program product for authenticating a user. The computer program product includes a computer readable storage medium having computer readable program code embodied therewith. The computer readable program code is adapted to perform the method steps described above when the program code is run on a computer.

BRIEF DESCRIPTION OF THE SEVERAL VIEWS OF THE DRAWINGS

Embodiments of the invention will now be described in more detail, by way of example only, with reference to the accompanying drawings.

DETAILED DESCRIPTION

Figure 1:
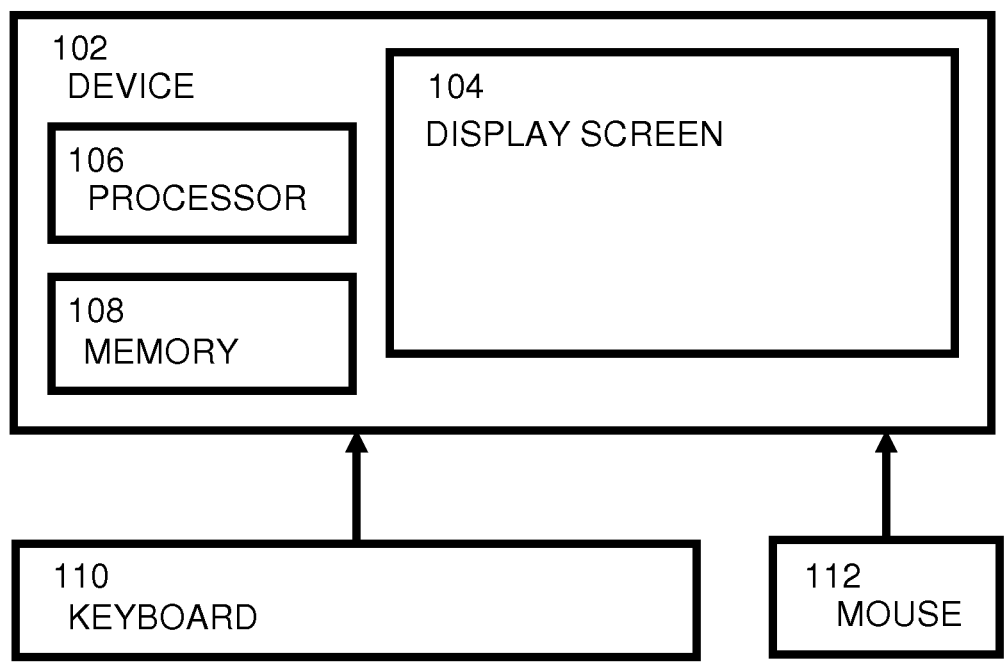
FIG. 1 shows a block diagram of a system in which embodiments of the invention may be implemented.

FIG. 1 shows a system 100 in which embodiments of user authentication using temporal knowledge of dynamic images may be implemented. System 100 includes device 102. Device 102 includes a display screen 104, a processor 106, and a memory 108. Device 102 needs to have a way for a user to provide input by making selections in response to dynamic images displayed on display screen 104. Optionally, device 102 may be associated with a keyboard 110, which may be wired or wireless, and a mouse 112, which also may be wired or wireless. Other input devices, such as a trackball, may be used to perform a similar function to mouse 112 or keyboard 110. Also, display screen 104 optionally may be a touchscreen. Keyboard 110, mouse 112, or another input device or touchscreen may be used to provide input from the user making selections in response to dynamic images displayed on display screen 104.

Figure 2:
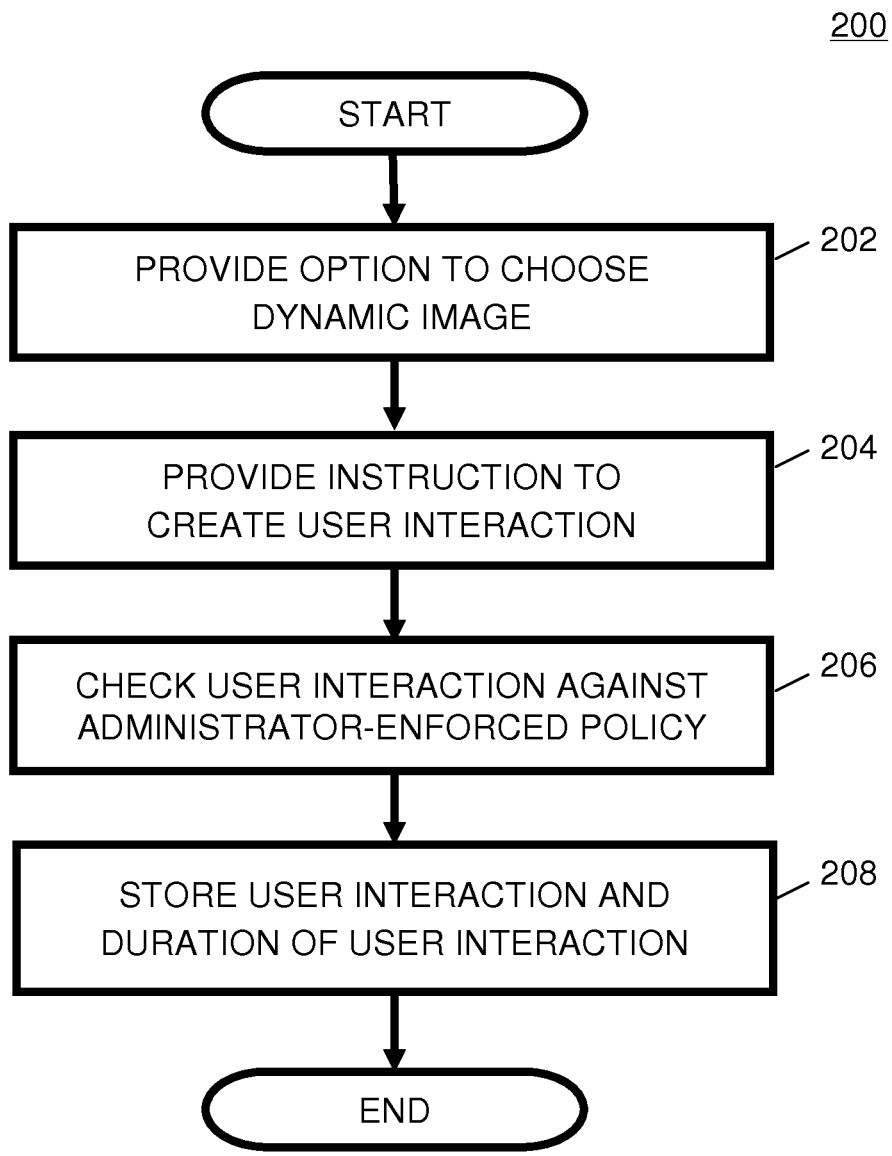
FIG. 2 shows a flow chart of a dynamic image configuration process, according to an embodiment.

FIG. 2 shows a dynamic image configuration process reflected in a method 200, according to an embodiment. At step 202 the user is provided an option to choose a dynamic image. The dynamic image may include a set of static images displayed in a predefined sequence (i.e., a series of static images), or the dynamic image may include a set of images forming a video stream. Specifically, the user either chooses an existing set of images, stored on device 102 or elsewhere, or chooses to create a set of randomly generated images.

At step 204, the user is provided an instruction to touch display screen 104, click mouse 112, or provide other input to create a memorable user interaction (or multiple user interactions). Such user interaction may include a simple touch or click. Such user interaction also may include a touch on display screen 104 held for a duration of time and then released or a click of mouse 112 held for a duration of time and then released. Such user interaction also may include movement; for instance, such user interaction may be initiated at a first location on display screen 104, held while moving to a second location on display screen 104, and then released at the second location. If a touch on display screen 104 is used, then the movement of a finger or stylus is used to move from the first location to the second location. If a click of mouse 112 is used, then the movement of the mouse is used to move from the first location to the second location.

At step 206, the user interaction created at step 204 optionally may be checked against an administrator-enforced policy. Such a policy may be used to specify a minimum number of required points at which a user interaction is made. The policy also may specify constraints such as a minimum distance in pixels that points must be away from previously selected points or a minimum time or movement between points. The policy additionally may specify an error margin; specifically, the policy may specify a maximum error rate allowed by the user in terms of time and position. A maximum error rate may be specified because it is unlikely that the user will be accurate within a pixel of movement or within a millisecond of time when reentering data during an authentication process, such as one of the processes as described herein with respect to FIGS. 3 and 6.

At step 208, the user interaction and the duration of the user interaction are stored for use during an authentication process. According to an embodiment, the stored user interaction and the stored duration include respective ranges of accepted values for the stored user interaction and the stored duration.

Figure 3:
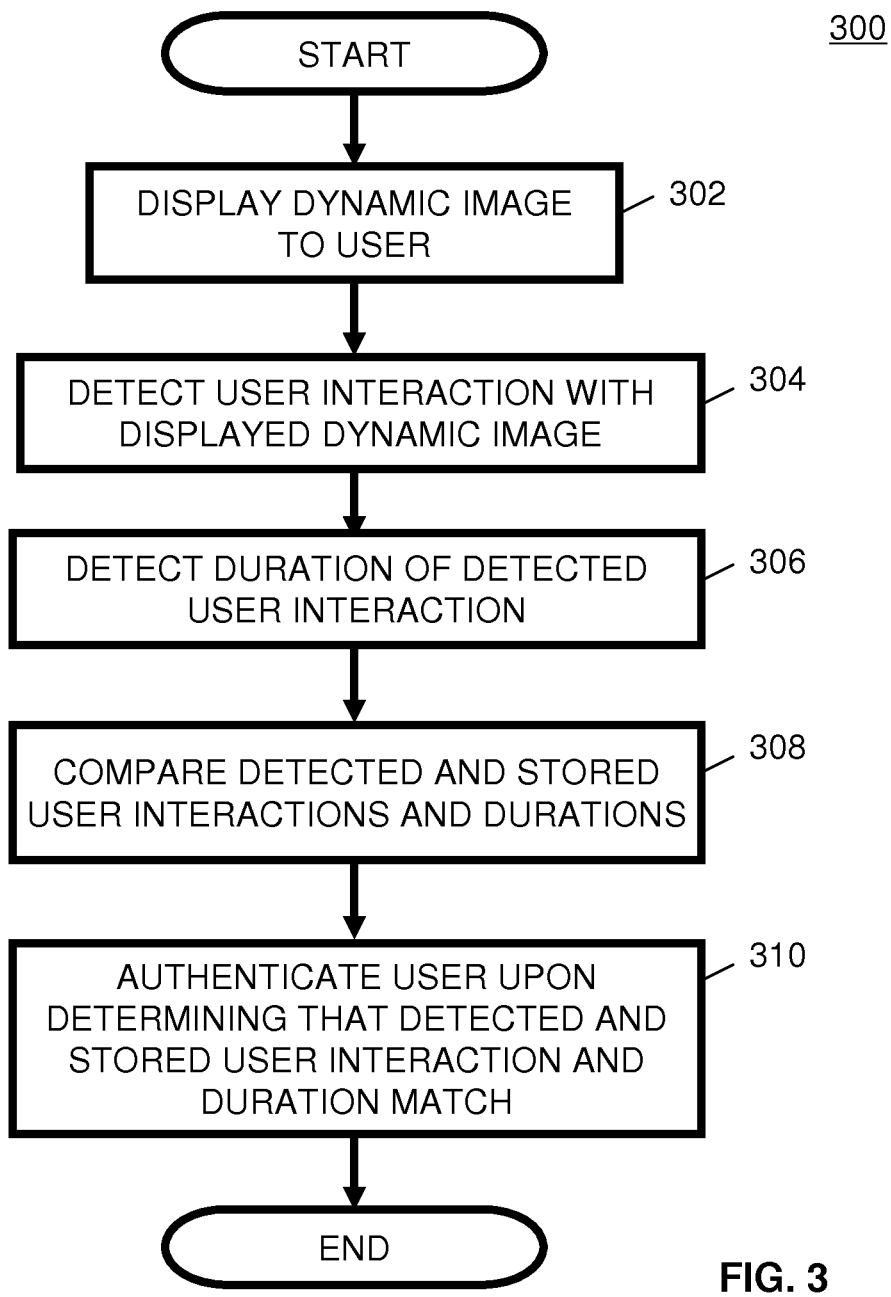
FIG. 3 shows a flow chart of an authentication process, according to an embodiment.

FIG. 3 shows an authentication process reflected in a method 300. At step 302, a dynamic image is displayed to the user. As previously explained, the dynamic image may be a set of static images displayed in a predefined sequence or may be a set of images forming a video stream. At step 304, a user interaction is detected with respect to the displayed dynamic image for authentication purposes. Such user interaction is created by the user upon touching or clicking display screen 104. Additionally, such user interaction involves a temporal factor, as the user interacts by selecting two (or more) points in time. This differs from traditional authentication systems that do not take into account the time between user interactions during the authentication session. By introducing a temporal factor as described, the user may provide additional knowledge (about time) while using a familiar, image-based interface that differs minimally in appearance and operation from traditional image-based authenticators.

Two embodiments in which the user is required to indicate knowledge of time now will be described. In both embodiments, the user interface involves displaying a dynamic image including either a series of static images or images forming a video stream.

In a first embodiment, an authentication scheme displays a dynamic image (e.g., a video stream) known to the user on display screen 104. At a first point in time, the dynamic image displays a first event that the user recognizes as occurring at the start of a time period. At such first point in time the user interacts with system 100 to select the first event, for example, by touching display screen 104 or an attached keypad (e.g., keyboard 110) to select the first event, thus indicating knowledge of such first point in time to the authentication scheme. At a second point in time the dynamic image displays a second event known to the user. At such second point in time the user once again interacts with system 100 to select the second event. Such interaction may be repeated as many times as is sufficient for the authentication session.

In a second embodiment, an authentication scheme displays images of several dynamic objects, such as moving objects, on display screen 104. The user may interact with system 100 by touching display screen 104 and following one of the moving objects with a finger or a stylus (or a similar item) for a period of time. The user also may interact by using mouse 112 and clicking on a moving object and following the moving object with a button of mouse 112 depressed. This authentication scheme optionally may take into account a first point in time at which the user begins following the moving object and a second point in time at which the user stops following it. Optionally the authentication scheme also may acknowledge which moving object is followed.

Both embodiments described allow the user to indicate knowledge, such as the time period of a significant event. Such knowledge is provided to the authentication scheme in the form of a time period. In both embodiments, one or more factors are tracked during the user interaction. These factors include contact time (i.e., when the user makes contact with display screen 104), contact position (i.e., where the user makes contact with display screen 104), contact length, and movement (e.g., of a finger/stylus or mouse pointer) while in contact with display screen 104. This information is expressed in the authentication scheme and is used for validation.

At step 306, a duration of user interaction is detected. Specifically, data is captured for the period of time during which contact with display screen 104 is made. Optionally, data is captured for each point on display screen 104 that the user touched or clicked. Optionally, data also is captured for a path followed in the case of prolonged contact with display screen 104. This allows the user to track a particular point across display screen 104.

Figures 4, 5:
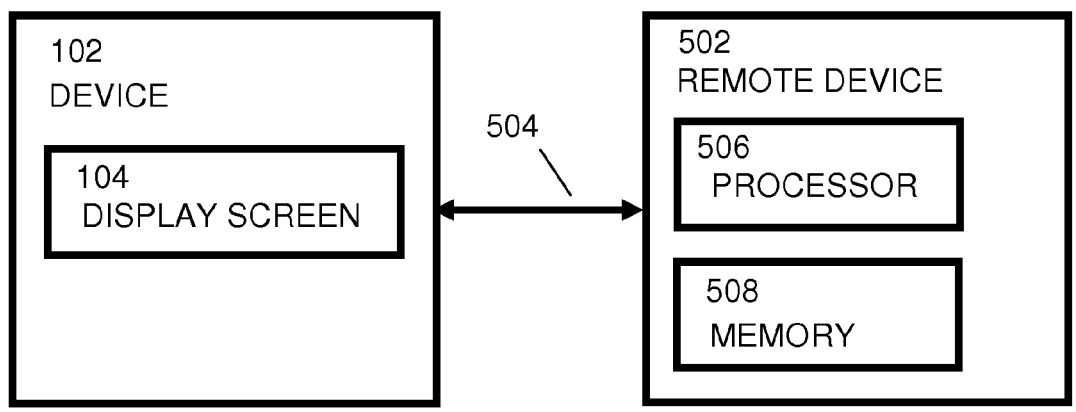
FIG. 4 shows a data table including user interaction duration data, according to an embodiment.
FIG. 5 shows a block diagram of a system including a device in communication with a remote processor, according to an embodiment.

Referring to FIG. 4, an exemplary data structure 400 for the captured duration data is shown. In the exemplary data structure, there are entries for each contact made by the user with display screen 104. Exemplary entries include fields for the elapsed time from the start of the display of the dynamic image on display screen 104, the X location and Y location of the contact made with display screen 104, and the duration of the contact made with display screen 104. According to the example of FIG. 4, a first contact is made at point (240, 120) on display screen 104 starting at elapsed time 1000 and lasting for a duration of 1000 units until elapsed time 2000. A second contact is made at point (240, 480) on display screen 104 starting at elapsed time 5000 and lasting for a duration of 500 units until elapsed time 5500. A third contact is made at point (480, 480) on display screen 104 starting at elapsed time 7000 and lasting for a duration of 1000 units until elapsed time 8000.

The data structure 400 of FIG. 4 shows an optional field for the path of the contact made. This may be used to record the X locations and Y locations of the track followed during continuous contact with display screen 104. As illustrated in FIG. 4, no data is provided in the path field for this particular example.

Returning to FIG. 3, the duration data recorded at step 306 provides sufficiently granular timekeeping to differentiate between significant parts of the dynamic image. At one extreme, this may be on a frame-by-frame basis. The authentication protocol is extended to encapsulate the recorded duration data points, for example, provided in the protocol as a set of time and position values captured during the interactive phase. According to embodiments, the duration data points are described in an XML or JSON schema. The detected user interaction and the detected duration optionally may be stored for processing. In another embodiment, the user interaction and the duration are submitted directly for processing without being stored first.

Upon completion of steps 302, 304 and 306, at step 308 the user interaction and the duration of the user interaction stored during the configuration process of the method 200 are compared with the user interaction as detected at step 304 and the duration of the user interaction as detected at step 306. Step 308 includes an evaluation of the duration data points. Each duration data point may be considered within bounds of a predefined value, plus or minus a specified value (which may itself be configurable).

At step 310, upon determining that the detected user interaction and the duration of the user interaction match the stored user interaction and duration of the user interaction, the user is authenticated. A match may be indicated if the user interaction and the duration of the user interaction fall within the error margin specified by the administrator-enforced policy.

Referring to FIG. 5, a system 500 in which further embodiments of the present invention may be implemented is shown. System 500 includes device 102 having display screen 104. Processor 106 and memory 108 of device 102 as shown in FIG. 1 are optional in device 102 as shown in FIG. 5 and thus are not explicitly illustrated in FIG. 5. Display screen 104 may be a touchscreen, which may be used to provide input from a user making selections in response to a dynamic image displayed on display screen 104.

In system 500, implementation of an authentication method takes place, in part, on a remote device 502. Remote device 502 includes a processor 506 and a memory 508. Device 102 communicates with remote device 502 via a network 504 such as the Internet or a local area network using wired or wireless communication.

Figure 6:
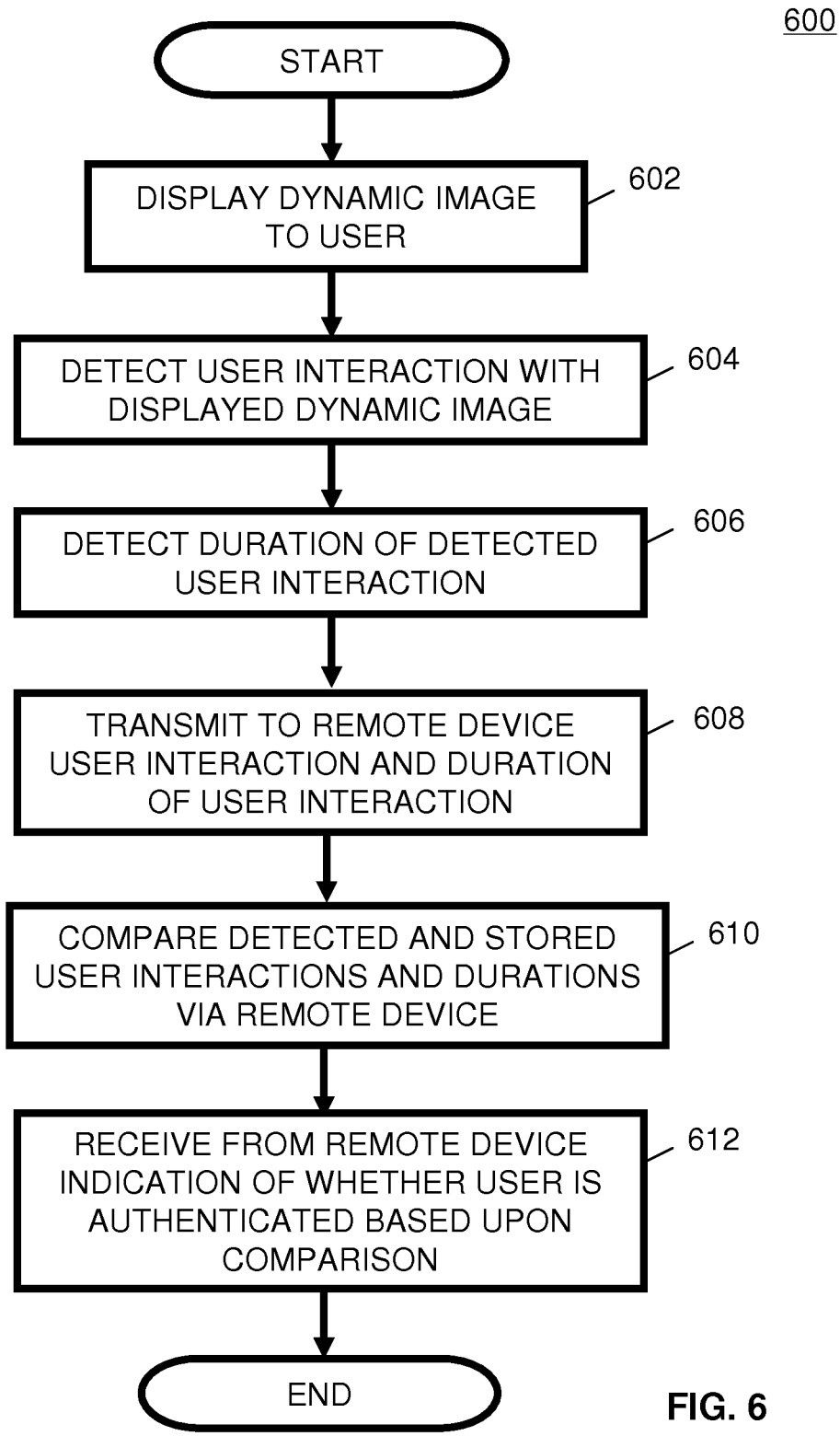
FIG. 6 shows a flow chart of an authentication process, according to a further embodiment.

FIG. 6 shows an authentication process reflected in a method 600. The method 600 is implemented in system 500. Steps 602 to 606 of the method 600 are similar to steps 302 to 308 of the method 300. At step 602, a dynamic image is displayed to the user. At step 604, user interaction is detected with respect to the displayed dynamic image for authentication purposes. Step 604 is carried out upon displaying the dynamic image at step 602. At step 606, a duration of user interaction is detected.

Upon completion of steps 602, 604 and 606, at step 608 the user interaction and the duration of the user interaction are transmitted to remote device 502. At step 610, the user interaction and the duration of the user interaction stored during the configuration process of the method 200 are compared with the user interaction as detected at step 604 and the duration of the user interaction as detected at step 606 via remote device 502. Step 610 optionally may include an evaluation of the duration data points. Each duration data point may be considered within bounds of a predefined value, plus or minus a specified value (which may itself be configurable). At step 612, an indication of whether the user has been authenticated based on results of the comparison at step 610 is received at device 102 from remote device 502.

Embodiments of the invention can take the form of a computer program accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk, and an optical disk. Current examples of optical disks include compact disk read only memory (CD-ROM), compact disk read/write (CD-RW), and DVD.

The invention claimed is:

1. A method for authenticating a user, the method comprising:
   displaying a dynamic image on a display screen;
   detecting a user interaction with the dynamic image;
   detecting a duration of the detected user interaction, wherein the detected duration is recorded using duration data points described in a text format schema, and wherein authentication encapsulates the duration data points;
   transmitting to a remote device the detected user interaction and the detected duration in order to compare the detected user interaction and the detected duration with a stored user interaction and a stored duration, the stored user interaction checked against a policy specifying a minimum number of two or more required interaction points with the display screen, and in order to authenticate the user upon determining that (i) the detected user interaction matches the stored user interaction and (ii) the detected duration matches the stored duration; and
   receiving from the remote device an indication of whether the user is authenticated.

2. The method of claim 1, wherein the dynamic image comprises a series of static images.

3. The method of claim 1, wherein the dynamic image comprises a video data stream.

4. The method of claim 1, wherein the user interaction comprises following by the user of one or more dynamic objects displayed in the dynamic image.

5. The method of claim 1, wherein the detected user interaction comprises information selected from the group consisting of time of contact with the display screen and position of contact with the display screen.

6. The method of claim 1, wherein the stored user interaction and the stored duration comprise respective ranges of accepted values for the stored user interaction and the stored duration.

7. The method of claim 1, wherein the detected user interaction comprises information with respect to movement while in contact with the display screen.

8. The method of claim 1, wherein the detected duration includes duration of contact with the display screen.

9. The method of claim 1, wherein the policy further specifies a minimum time or movement between interaction points.

10. A system for authenticating a user, the system comprising:
    a processor;
    a memory storing a computer program, which, when executed on the processor, performs an operation comprising:
    displaying a dynamic image on a display screen;
    detecting a user interaction with the dynamic image;
    detecting a duration of the detected user interaction, wherein the detected duration is recorded using duration data points described in a text format schema, and wherein authentication encapsulates the duration data points;
    transmitting to a remote device the detected user interaction and the detected duration in order to compare the detected user interaction and the detected duration with a stored user interaction and a stored duration, the stored user interaction checked against a policy specifying a minimum number of two or more required interaction points with the display screen, and in order to authenticate the user upon determining that (i) the detected user interaction matches the stored user interaction and (ii) the detected duration matches the stored duration; and
    receiving from the remote device an indication of whether the user is authenticated.

11. The system of claim 10, wherein the dynamic image comprises a series of static images.

12. The system of claim 10, wherein the dynamic image comprises a video data stream.

13. The system of claim 10, wherein the user interaction comprises following by the user of one or more dynamic objects displayed in the dynamic image.

14. The system of claim 10, wherein the detected user interaction comprises information selected from the group consisting of time of contact with the display screen and position of contact with the display screen.

15. The system of claim 10, wherein the stored user interaction and the stored duration comprise respective ranges of accepted values for the stored user interaction and the stored duration.

16. The system of claim 10, wherein the policy further specifies a minimum time or movement between interaction points.

17. A computer program product for authenticating a user, the computer program product comprising a non-transitory computer readable storage medium having computer readable program code embodied therewith, wherein the computer readable program code is adapted to:
    display a dynamic image on a display screen;
    detect a user interaction with the dynamic image;
    detect a duration of the detected user interaction, wherein the detected duration is recorded using duration data points described in a text format schema, and wherein authentication encapsulates the duration data points;
    transmit to a remote device the detected user interaction and the detected duration in order to compare the detected user interaction and the detected duration with a stored user interaction and a stored duration, the stored user interaction checked against a policy specifying a minimum number of two or more required interaction points with the display screen, and in order to authenticate the user upon determining that (i) the detected user interaction matches the stored user interaction and (ii) the detected duration matches the stored duration; and
    receive from the remote device an indication of whether the user is authenticated.

18. The computer program product of claim 17, wherein the user interaction comprises following by the user of one or more dynamic objects displayed in the dynamic image.

19. The computer program product of claim 17, wherein the detected user interaction comprises information selected from the group consisting of time of contact with the display screen and position of contact with the display screen.

20. The computer program product of claim 17, wherein the policy further specifies a minimum time or movement between interaction points.

* * * * *